United States Patent
Wachtel et al.

(10) Patent No.: US 7,215,364 B2
(45) Date of Patent: May 8, 2007

(54) DIGITAL IMAGING SYSTEM USING OVERLAPPING IMAGES TO FORMULATE A SEAMLESS COMPOSITE IMAGE AND IMPLEMENTED USING EITHER A DIGITAL IMAGING SENSOR ARRAY

(75) Inventors: Robert A. Wachtel, St. Cloud, FL (US); John Keable, Hilton Head Island, SC (US); Richard Paulson, Kissimmee, FL (US)

(73) Assignee: PanX Imaging, Inc., Hilton Head, SC (US)

( * ) Notice: Subject to any disclaimer, the term of this patent is extended or adjusted under 35 U.S.C. 154(b) by 673 days.

(21) Appl. No.: 10/411,884

(22) Filed: Apr. 10, 2003

(65) Prior Publication Data

US 2004/0061774 A1  Apr. 1, 2004

Related U.S. Application Data

(60) Provisional application No. 60/371,608, filed on Apr. 10, 2002.

(51) Int. Cl.
*H04N 5/225* (2006.01)
*G06K 9/36* (2006.01)

(52) U.S. Cl. .............. 348/218.1; 348/36; 348/143; 348/262; 348/584; 382/284

(58) Field of Classification Search ............. 348/218.1, 348/207.99, 39, 36, 153, 159, 584, 211.11, 348/262; 396/323, 335; 382/284
See application file for complete search history.

(56) References Cited

U.S. PATENT DOCUMENTS

| | | | |
|---|---|---|---|
| 366,225 A | 7/1887 | Kuhn | 396/333 |
| 3,069,987 A | 12/1962 | Harrington | 396/335 |
| 3,202,069 A | 8/1965 | Cummins et al. | 396/335 |
| 3,323,432 A | 6/1967 | Rabanit | 396/323 |
| 3,796,485 A | 3/1974 | Seiden | 396/31 |
| 4,101,913 A | 7/1978 | Gallistel et al. | 396/335 |
| 4,797,942 A | 1/1989 | Burt | 382/284 |
| 4,851,867 A | 7/1989 | Taniguchi | 396/323 |
| 5,001,504 A | 3/1991 | Okada | 396/323 |
| 5,136,319 A | 8/1992 | Ushiro et al. | 396/326 |
| 5,187,571 A | 2/1993 | Braun et al. | 348/39 |
| 5,210,557 A | 5/1993 | Kameyama et al. | 396/335 |
| 5,325,449 A | 6/1994 | Burt et al. | 382/240 |
| 5,361,108 A | 11/1994 | Kamata et al. | 396/333 |
| 5,424,792 A | 6/1995 | Mikami | 396/335 |
| D377,186 S | 1/1997 | Fukuda | D16/208 |
| 5,649,032 A | 7/1997 | Burt et al. | 348/588 |
| 5,649,250 A | 7/1997 | Sasaki | 396/333 |
| 5,668,595 A * | 9/1997 | Katayama et al. | 348/218.1 |

FOREIGN PATENT DOCUMENTS

JP  363055532  3/1988

*Primary Examiner*—David Ometz
*Assistant Examiner*—Pritham D. Prabhakher
(74) *Attorney, Agent, or Firm*—James H. Beusse; Beusse Wolter Sanks Mora & Maire, P.A.

(57) ABSTRACT

An imaging system for obtaining a wide field of view comprises a plurality of imaging devices each having a defined field of view and each of the imaging devices having a mechanism for capturing an image at a selected time instant. The imaging devices are positioned such that the field of view of each device overlaps the field of view of each adjacent device. A control module simultaneously actuates each of the imaging devices to capturing an image within the field of view of all devices concurrently. The resulting images from each of the devices are merged to produce a wide field of view image.

9 Claims, 3 Drawing Sheets

U.S. PATENT DOCUMENTS

| | | |
|---|---|---|
| 5,678,088 A | 10/1997 | Fuss .......................... 396/323 |
| 5,708,469 A | 1/1998 | Herzberg ..................... 348/39 |
| 5,708,883 A | 1/1998 | Segan et al. ................. 396/339 |
| 5,721,963 A | 2/1998 | Iwagaki et al. ................ 396/6 |
| 5,798,791 A * | 8/1998 | Katayama et al. ....... 348/218.1 |
| 5,848,307 A | 12/1998 | Uchiyama et al. .......... 396/322 |
| 5,852,753 A | 12/1998 | Lo et al. .................... 396/323 |
| 5,878,283 A | 3/1999 | House et al. ................. 396/6 |
| 5,991,444 A | 11/1999 | Burt et al. .................. 382/232 |
| 5,999,662 A | 12/1999 | Burt et al. .................. 382/284 |
| 6,031,996 A | 2/2000 | Stephenson, III .............. 396/6 |
| 6,034,716 A | 3/2000 | Whiting et al. ............... 348/36 |
| 6,075,905 A | 6/2000 | Herman et al. ............. 382/284 |
| 6,078,701 A | 6/2000 | Hsu et al. ................... 382/294 |
| 6,128,143 A | 10/2000 | Naiwa ....................... 359/725 |
| 6,173,087 B1 | 1/2001 | Kumar et al. ............... 382/284 |
| 6,195,125 B1 * | 2/2001 | Udagawa et al. ........ 348/222.1 |
| 6,211,911 B1 * | 4/2001 | Komiya et al. .......... 348/218.1 |
| 6,304,284 B1 * | 10/2001 | Dunton et al. ................ 348/36 |
| 6,393,163 B1 | 5/2002 | Burt et al. .................. 382/294 |
| 6,788,828 B2 * | 9/2004 | Katayama et al. .......... 382/284 |
| 7,006,123 B2 * | 2/2006 | Yoshikawa et al. ........... 348/36 |
| 7,006,132 B2 * | 2/2006 | Pereira et al. ............ 348/218.1 |
| 7,023,913 B1 * | 4/2006 | Monroe ................. 375/240.01 |
| 7,092,014 B1 * | 8/2006 | Li et al. .................. 348/218.1 |
| 2002/0163582 A1 * | 11/2002 | Gruber et al. ........... 348/218.1 |

\* cited by examiner

DIGITAL IMAGING SYSTEM USING OVERLAPPING IMAGES TO FORMULATE A SEAMLESS COMPOSITE IMAGE AND IMPLEMENTED USING EITHER A DIGITAL IMAGING SENSOR ARRAY

This application claims the benefit of U.S. Provisional Application No. 60/371,608, filed Apr. 10, 2002.

FIELD OF THE INVENTION

The present invention relates to photographic image processing and reproduction and, more particularly, to a method and apparatus for creating composite, wide angle images.

BACKGROUND OF THE INVENTION

It has been recorded that as early as the 1880's the idea of including more of an image on a print than what was available from a lens was attempted. The early inventions moved the camera as well as the film to allow synchronization with the field of view. The result was a developed film that contained a 360 degree (or less) image. The left part of the print was taken earlier than the right part of the print. This time slippage created image anomalies such as double images of moving objects within the multiple fields of view used to create the composite print or image.

As technology progressed, the same type of wide view camera, referred to as the moving camera technology, has significantly been refined. One embodiment rotates a mirror instead of the camera but still requires multiple images to encompass the desired field of view. The fundamental problem with this type of camera system is that it creates time slippage from left to right across the composite field of view.

One attempt to create composite images without a time shift was developed using a parabolic mirror placed perpendicular to a camera lens. Due to the shape of the mirror, a 360 degree perpendicular image is focused on the camera lens. The primary problem with this camera system is that the 360 degree image appears circular on the camera film or sensor when projected to a flat print, the resulting image has visible anomalies much like a Mercatur map projection of the earth.

More recently, the advent of digital camera technology has enabled photographers to rapidly acquire multiple digital images by rotating the field of view of a camera while collecting images. Computer programs have been developed for combining these multiple images into a composite image. However, notwithstanding the smaller time shift across the composite image, images attempting to capture action events such as automobile racing or basketball games still result in anomalies from fast moving objects.

SUMMARY OF THE INVENTION

A broad aspect of the present invention is to provide a multi-overlapping field of view camera apparatus comprising a plurality of lens/sensors.

Another aspect of the present invention is that it defines specific geometries of planar (0–360 degrees in the X or left-right direction and 0 degrees in the Y or up-down direction), multi-planar (0–360 degrees in the X direction and greater than 0 degrees but less than 360 degrees in the Y direction, and spherical (360 degrees in both the X and Y directions).

A particular aspect of the present invention is that in all cases, the geometries must be rigidly fixed in order to create a composite image without artifacts.

Another particular aspect of the present invention is a method processing the individual overlapping images obtained from the multi-sensor array fixture and merging them into a composite field of view.

Another particular aspect of the present invention is a method of incorporating artificial intelligence through a complex neural network. Using this technique, the algorithm for registering images is optimized as well as allowing the user of the device to remove perspective error.

The present invention comprises a computer controlled image capturing system for capturing images that encapsulate a wide field of view and require distinct images of objects moving at rapid speeds or for capturing time sequence images as an object traverses through a stationary field of view. In one embodiment, the invention incorporates 5 Kodak DX-3900 cameras as imaging devices in a lens/sensor array fixed on a planar platform. In another embodiment, the invention incorporates 9 Kodak DX-4900 cameras as imaging devices in the lens/sensor array fixed on a planar platform. In each embodiment, the cameras can be synchronized and controlled to operate concurrently to capture images within the field of view of each camera at the same instant. Alternately, the cameras can be synchronized to capture images across the field of view of the array with a set time delay between each camera so that multiple images of an object moving rapidly across the array field of view are obtained. The latter embodiment may be useful in tracking flight paths of objects. All of the captured images are transported to a set of digital signal processing (DSP) elements in parallel where they are analyzed and a composite image is constructed.

DETAILED DESCRIPTION OF THE INVENTION

Figure 1:
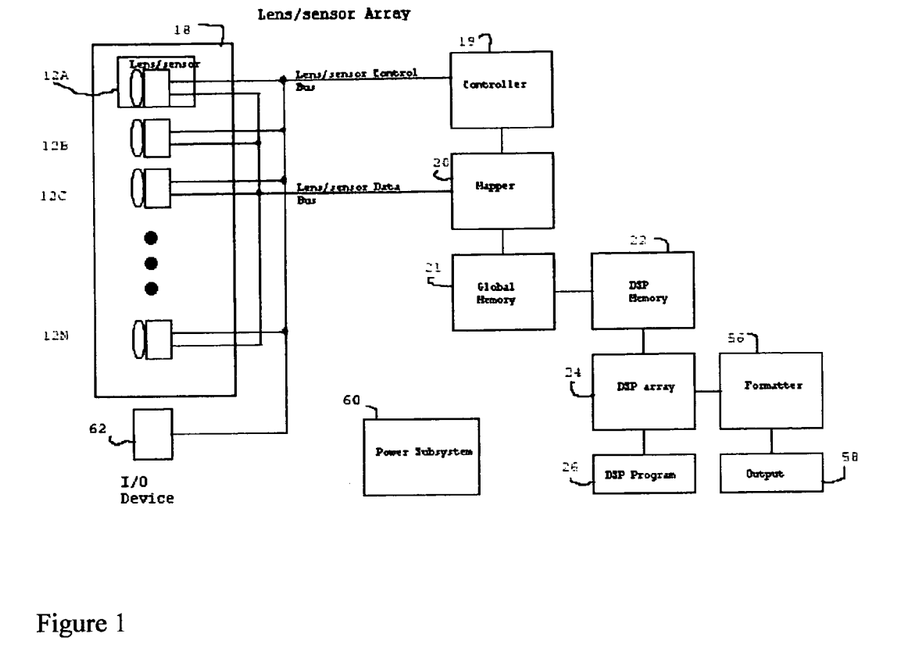
FIG. 1 is a block diagram of one form of the present invention.

The invention 10 is diagrammatically shown in FIG. 1 and comprises a lens/sensor array 18 having a plurality of imaging devices or lens/sensors 12. The lens/sensors are typically a focusing lens positioned adjacent a digital sensor such as a CCD array. Each lens/sensor array may be focused on a scene, portion of a scene or another image taken with a film-based camera. A controller 19 controls the functions of the lens/sensors 12. A software program or standard combinational logic defines the operation of this element. In one form, controller 19 may be an electronic or mechanical switch array for providing control signals such as shutter or capture start/stop to each lens/sensor 12.

The software program is resident in a DSP program module 26 and effects control of controller 19 through a DSP processor 24. The image data (pixel data) is received by a mapper 20 which moves the pixel data from each lens/sensor 12 to specific addresses in a global memory 21, which may be RAM memory.

A DSP memory 22 is a conventional memory module and associated processor for Direct Memory Access (DMA) to Global Memory 21. DSP memory 22 is operatively coupled to the DSP array 24 which comprises a plurality of DSP integrated circuits (25). A software program resident in module 26 defines the operation of the DSP array.

A formatter 56 converts the pixel data into a form that can be used by viewers and printers. Typically, the pixel data is placed in a JPEG format.

An output module 58 sends the formatted image data to a viewing or printing device. All of the electronic modules are powered from a common regulated supply 60. While the supply 60 is conventional, it should be noted that each CCD sensor must be regulated to provide equal intensity from each sensor in order to avoid differing light levels.

In one embodiment of the invention, the array 18 uses Kodak DX-3900 cameras for lens/sensors 12. Five cameras are arranged in a geometry such that each camera lens is placed equidistance from a central point and aligned on a radius from the point such that the subtended angle between each lens/sensor 12 is 45 degrees. Power is supplied using a common 6.3 volt lead-acid battery coupled to individual voltage regulators for each camera. Controller 19 is implemented by modifying each DX-3900 and connecting focus and capture leads to relays controlled by module 62 which provides a single concurrently to each camera 12 through a single activation switch.

In another embodiment, the array 18 uses nine Kodak DX-4900 cameras with each camera corresponding to one of the lens/sensors 12. In this embodiment, the camera lens are positioned in a geometry such that each lens/sensor 12 is placed equidistance from a central point and aligned perpendicularly to a radius from such point such that the subtended angle between each lens/sensor 12 is 22.5 degrees. As in the first embodiment, power is supplied using a common 6.3 volt lead-acid battery and individual voltage regulators for each camera. The controller 19 includes additional switching functions for controlling the additional ones of the camera 12 in response to image capture commands from relay activation module 62. In both embodiments, the modification of the cameras to connect the focus and capture controls to controller 19 will be apparent to those ordinarily skilled in the art.

While the invention as described with reference to FIG. 1 utilizes a plurality of separate cameras, it will be recognized that multiple CCD type image sensors and associated lenses could be incorporated into a single camera body and thereby reduce the unnecessary duplication of functions such as memory storage in each camera. More particularly, the lens/sensor array 18 need be only a plurality of lens/sensors 12 each comprising an optical lens with a light sensor. In the model DX-3900, the sensor is a 3.1 megapixel CCD sensor. In the Model DX-4900, the sensor is a megapixel 4.1 megapixel CCD sensor. The higher the density of the sensor, i.e., the higher the number of picture elements or pixels, the more detail there will be in the captured image. However, the lens also effect image quality and applicants have found that an optical lens with focal length of 35–70 mm provide suitable imaging in most applications. Further, the final image in a panoramic view is preferably obtained using a sensor such as the CCD sensor having a height to width ratio of about 2:3. While CCD sensors are preferred because of their ready availability and light response, it will be recognized that the invention could be implemented with other types of sensors.

Figure 2:
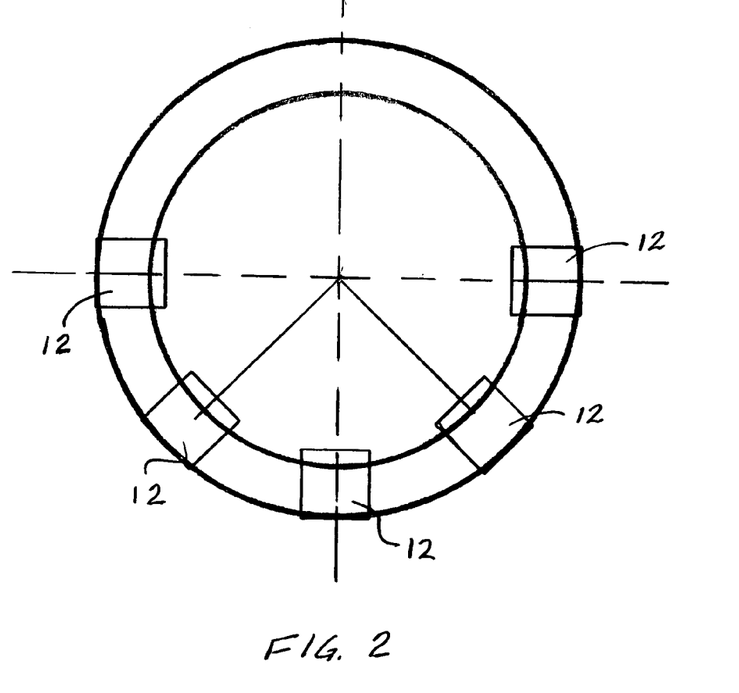
FIG. 2 is a plan view of one implementation of the inventive camera system.

As discussed above, the lens/sensors 12, e.g., digital cameras, are arranged into an array such that each lens/sensor field of view slightly overlaps the field of view of each adjacent lens/sensor. In one form, the lens/sensors 12 are placed in a single plane such that the field of view in the X direction, i.e., horizontal, is up to and including 360 degrees for the composite array. The field of view in the Y or vertical direction, is centered at 0 degrees, i.e., the field of view in the Y direction is a function solely of the field of view of each individual lens/sensor 12. An example of this form of array is shown in plan view in FIG. 2 in which five lens/sensors 12 are uniformly distributed about and equidistant from a center-point 30 on a flat, circular platform 32. Each sensor 12 provides an image which has an overlapping field of view with adjacent sensors. It will be apparent that an increased field of view in a vertical plane can be obtained by stacking multiple levels or planes of lens/sensor with each added level being oriented vertically to have overlapping fields of view with lens/sensors in adjacent levels, i.e., the lens/sensors can be angularly oriented in a vertical direction similar to the orientation in the horizontal direction. Such an arrangement can produce a spherical image sensor array suitable for use, for example, in making stellar images. Clearly, the orientation of the lens/sensors will approach a spherical orientation depending on the desired composite field of view.

Various architectures can be used for the array 18, such as, for example, three lens/sensors configured in a 180 degree planar array with an angular shift of 45 degrees; five lens/sensors configured in a 180 degree planar array with an angular shift of 45 degrees; nine lens/sensors configured in a 180 degree planar array with an angular shift of 22.5 degrees; and eight lens/sensors configured in a 360 degree planar array with an angular shift of 45 degrees.

All of the above are single plane embodiments. For a multiplanar array, various architectures using different numbers of lens/sensors arranged in multiple planes are possible. Some examples are: nine lens/sensors configured in a multiplanar array where one lens/sensors is in a first plane with a center of focus being defined at 0 degrees, three lens/sensors are in a second plane with a center of focus being defined at 0 degrees for one lens/sensor and the other two lens/sensors having an angular shift of 45 degrees, five lens/sensors are in a third plane and the center of focus being defined at 0 degrees for one lens/sensor with the other four lens/sensors having an angular shift of 45 degrees, the angle subtended by the planes being 15 degrees with the third plane being defined at 0 degrees; eleven lens/sensors configured in a multiplanar array where three lens/sensors are in the first plane with a center of focus defined at 0 degrees for one lens/sensor and the other two lens/sensor have an angular shift of 45 degrees, five lens/sensors are in the second plane with a center of focus defined at 0 degrees for one lens/sensor and the other four lens/sensors have an angular shift of 45 degrees, three lens/sensors are in the third plane with a center of focus being defined at 0 degrees for one lens/sensor and the other two lens/sensors have an angular shift of 45 degrees, the second plane being defined as 0 degrees and the first and third plane subtend the angles +15 and −15 degrees, respectively; thirteen lens/sensors configured in a multiplanar array where one lens/sensors is in a first plane with a center of focus at 0 degrees, four lens/sensors are in a second plane with a center of focus defined at 0 degrees for one lens/sensor and the other three lens/sensors having an angular shift of 90 degrees, eight lens/sensors are in a third plane with a center of focus defined at 0 degrees for one lens/sensor and the other seven lens/sensors having an angular shift of 45 degrees, the third plane defined as 0 degrees, the second plane is at 45 degrees and the first plane is at 90 degrees; eighteen lens/sensors configured in a spherical array where one lens/sensors is in a first plane with a center of focus at 0 degrees, four lens/sensors are in a second plane with a center of focus defined at 0 degrees for one lens/sensor and the other three lens/sensors having an angular shift of 90 degrees, eight lens/sensors are in a third plane with a center of focus defined at 0 degrees for one lens/sensor and the other seven lens/sensors having an angular shift of 45 degrees, four lens/sensors are in a fourth plane with a center of focus defined at 0 degrees for one lens/sensor and the other three lens/sensors having an angular shift of 90 degrees, one lens/sensors is in a fifth plane with a center of focus at 0 degrees, the third plane being defined as 0 degrees, the second plane is at 45 degrees, the first plane is at 90 degrees, the fourth plane is at −45 degrees and the fifth plane is at −90 degrees; twenty-two lens/sensors configured in a spherical array where one lens/sensors is in a first plane with a center of focus at 0 degrees, six lens/sensors are in a second plane with a center of focus defined at 0 degrees for one lens/sensor and the other five lens/sensors having an angular shift of 60 degrees, eight lens/sensors are in a third plane with a center of focus defined at 0 degrees for one lens/sensor and the other seven lens/sensors having an angular shift of 45 degrees, six lens/sensors are in a fourth plane with a center of focus defined at 0 degrees for one lens/sensor and the other 5 lens/sensors having an angular shift of 60 degrees, and one lens/sensors is in a fifth plane with a center of focus at 0 degrees.

I/O module 62 incorporates functions normally found on a conventional digital camera such as focus control, image capture and a view-screen for monitoring images. The module 62 brings all these functions for all lens/sensors 12 into a single module. Additionally, module 62 interfaces with controller 19 to simultaneously apply control signals for image capture and other functions to all lens/sensors. However, the module 62 also includes set-up adjustments to allow individual control of some lens/sensor functions such as, for example, focus, or for setting time delays between actuation of each lens/sensor in order to capture multiple images of a moving object. The controller 19 may be implemented as a group of switching devices responsive to a single signal from module 62 to actuate each lens/sensor 12 concurrently.

The functions related to image captured and pixel data processing are well known and are implemented in the internal electronics of all digital cameras, including the exemplary Kodak cameras. Accordingly, the global memory 21, DSP memory 22 and processing of pixel data are known. The memory modules may be RAM or flash card either separate or part of an associated computer.

One embodiment of the invention uses a PC in lieu of a dedicated DSP array 24 since DSP array 24 is a programmable processor with program control 26. Preferably, the DSP array uses sequential program architecture although parallel processing could be used. The functions implemented in the DSP array include analysis of each of the images for light consistency by calculating a mean brightness level. The analysis may also include maximum to minimum brightness, maximum to minimum contrast, total white space, total black space, and mean contrast.

These parameters are calculated for the entire image and for the image divided into 9 equal sections or image areas (3 on top, 3 on bottom, 3 in the middle, 3 on left, 3 on right, 3 in the middle).

The baseline used for coordination is the mean brightness level and is determined by the mean brightness of the center image of the array. All other images are mathematically transformed (pixel data adjusted) so that their mean brightness is made to equal that of the baseline. This is performed on all nine areas of each image. When transforming with different vectors, a smoothing algorithm is also performed so that image overlap occurs in 25% of the next image area. The other parameters are stored for use by the AI subsystem.

Once corrected for brightness, the adjacent images are merged. The merging process requires several steps. Starting with two adjacent images a single interface line is defined. The present invention uniquely implements merging to form a composite image. Objects are determined by using color differentiation. A line segment is defined as an object and represents a vector where on one side of the vector is one color and on the other side of the vector is another color. The difference in colors is established using a high pass filter and grayscale on the image. The characteristic of the filter is initially a default of 5 pixels but will be enhanced by the AI engine as the device is utilized.

All lenses have distortions in them such as barrel effects or pincushion effects. Each lens in the array 18 is fully characterized at manufacture and these distortions are provided as a matrix of pixel corrections. Distortions generally are common around the edges of a lens so the matrix at the edge has an embedded matrix of more detailed corrections, i.e., the corrections are not linear.

Figure 3:
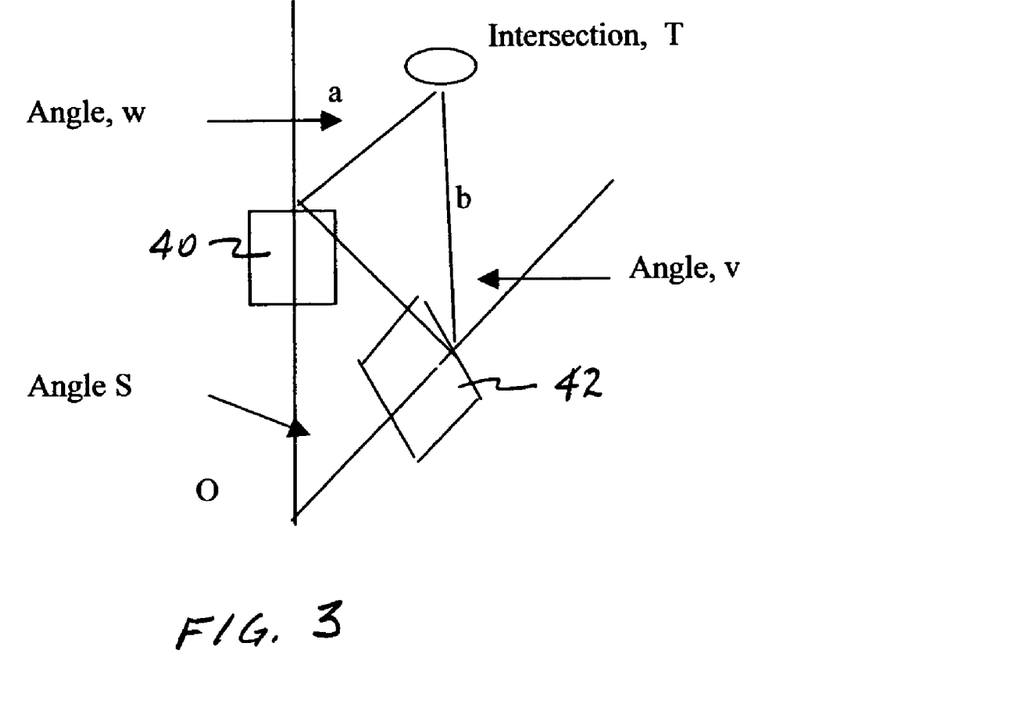
FIG. 3 is a drawing describing line segments and angles when determining the object distance from the apparatus centroid.

The geometry between each image is defined by the distance, d, between the centroid of the lenses and the angle, alpha, between them. The angle, w, shown in FIG. 3 is the angle between an object in space in reference to a line perpendicular to lens/sensor 40. The angle v is the angle to the same object (given that they overlap) as viewed by lens sensor 42. By recording these angles the intersection, T, of line segments a and b from each lens/sensor is defined. A set of linear equations for each line segment is generated, using the form y=mx+b where m is the slope and b is the y intercept.

Thus, for line segment a with the origin at lens/sensor 40:

$$y_a = \mathrm{Cot}(w)x$$

And for segment b with the origin at lens/sensor 42:

$$y_b = \mathrm{Cot}(v)x$$

But for the calculations to follow, the real origin is at the centroid of the array, O. This, then requires the transformation of axes.

For line segment a, with the origin at O: $y_a = \mathrm{Cot}(v)x + r$, where r is the radial dimension between centroid and lens/sensor.

For segment b with the origin at O, the transformation is: (x',y')=(x+r Cos(S),y+r Sin(S)) where S is the angle between radii to each lens sensor.

By then setting the two equations of the line segments equal to each other, the coordinates (and thus the distance using Pythagorean theorem) of all common objects from the centroid of the array can be determined.

All objects that are common to two adjacent images are determined to have a representative distance, d, from the centroid of the array. This is confirmed by evaluating the following error calculation:

$$\varepsilon = \frac{\sum\sum |P_1(x,y) - P_2(x,y)|}{Area}$$

where:
 $\varepsilon$ is the minimal error
 Area is the overlapping area
 P(x,y) are the images across x and y.

All common objects of the similar distances are then grouped together into bins. The width of these bins is deterministic.

Points on the objects are selected on the basis of bin identification. Each bin should be represented with a control point. This implies a state variable that is the triplet $[d_{bin\ n}, x_n, y_n]$. The same point is found in the adjacent image and represented as $[d_{bin\ n+1}, x_{n+1}, y_{n+1}]$.

A n-dimensional polynomial transformation is applied to image n+1 in order to merge it to the control points. For every order of the polynomial, four control points are required. The assumption is that the resulting image will be rectilinear. The expansion of the polynomial will determine the number of coefficients. For example for order 2 there will be 6 coefficients $(1,x,y,xy,x^2,y^2)$ For order 3 there will be 10 coefficients $(1,x,y,xy,x^2,y^2,yx^2,xy^2,x^3,y^3)$ For order 4 there will be 15 coefficients and so on.

Curve fitting can be implemented using one of three techniques, i.e., linear least squares evaluation, Levenberg-Marquardt algorithm or Gauss-Newton algorithm.

A significant number of the transformations will not fall on points coincident with the (x,y) pixelation grid. This is corrected by using interpolation. There are three techniques that are used in increasing complexity: nearest neighbor interpolation where the value of an interpolated point is the value of the nearest point; bilinear interpolation where the value of an interpolated point is a combination of the values of the four closest points; and bicubic interpolation where the value of an interpolated point is a combination of the values of the sixteen closest points.

While computationally expensive, the bicubic method is the default technique. It is believed that the bicubic method can be enhanced by weighting functions which gives more emphasis to pixels closer to the transformation point and less emphasis to pixels further away from the transformation point. Computer programs that can be used as part of the merging process include Panofactory 2.1. and Matlab 6.1. It will be appreciated that computer manipulation of pixel data for the merging process is necessary for the large number of pixels that must be processed in order to merge multiple images into a composite image using the above described technique.

Due to the characteristics of the polynomial transformations the composite image will not appear rectilinear and it must be cropped in order to be rectilinear.

It is recognized that many algorithm parameters are statistically based and may not represent the best solution for a given set of images. There are numerous variations in parametric corrections such as:

a. light compensation technique
 b. high pass filter response
 c. interpolation techniques
 d. interpolation weights
 e. spatial transformation technique
 f. curve fitting threshold In order to optimize the set, other groupings of these parameters can be implemented and the results displayed to an observer for comparison grading. The grading is recorded in the knowledgebase for future reference. Artificial intelligence (AI) can then evaluate a best set of parameters. Even the individual lens corrections are evaluated and entered into the permanent part of the knowledgebase.

As such, a multi-dimensional neural network is implemented. The memories associated with each node are hierarchical in nature. Issues such as individual lens distortions which create unique polynomials will not change once they have been locked in. Issues such as light compensation, on the other hand, will change with emphasis made on more recent memories (settings).

The artificial intelligence engine is a multi-dimensional neural network. It is a fixed architecture but the weighting functions and thresholds for each perceptron node will be unique to the individual camera, photographer, and/or scenic choice.

The fundamental equations of each node shall be:

temp=$((X1*w1)+(X2*w2)\ldots(Xn*wn))$

If (temp>$T$) then output is temp, else output=0

Where X1 . . . Xn are input elements, w1 . . . wn are weighted elements and T is the overall threshold for that node.

While the background software and initialized-AI engine is fixed, the dynamic nature of the knowledgebase will provide a camera that implements custom software as it is needed. The neural network is implemented using a fixed-perception architecture available in most high-end mathematics software toolboxes, e.g., Matlab 6.1.

Figure 4:
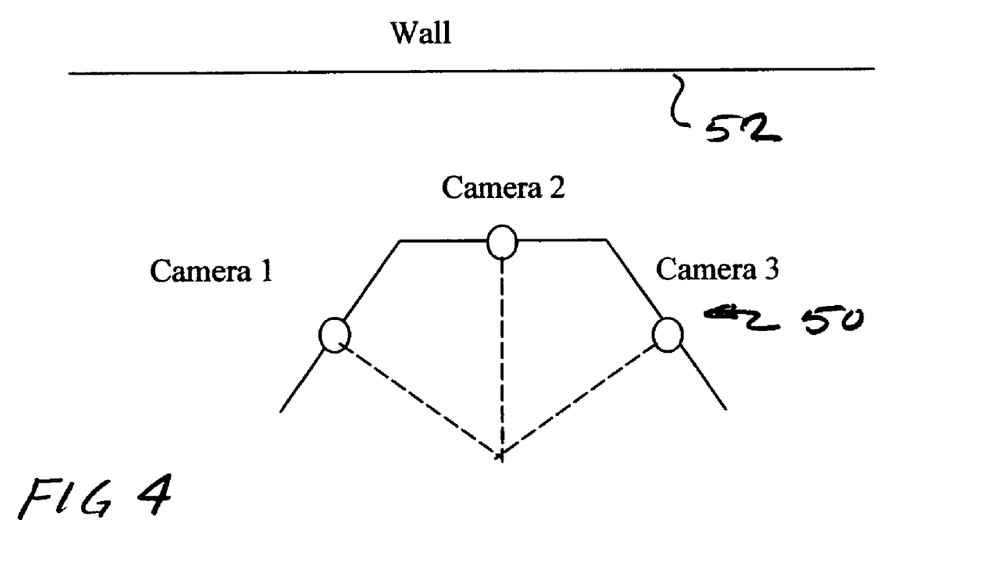
FIG. 4 illustrates camera positions to display perspective error.
Figure 5:
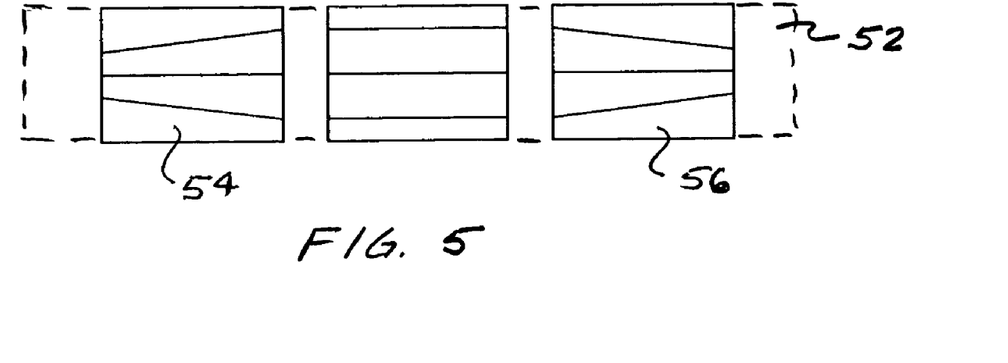
FIG. 5 is a drawing showing perspective error for FIG. 4.

Besides the actual image registration and light average tuning with the AI engine as described above, the problem of perspective error is also linked to the AI engine. The reason it is separated from the other parameters is that it is much more of a psychological phenomenon than a mathematical issue. It is due to the cognitive way in which the human eye sees things and how an individual wants to see scenes. For example, FIG. 4 displays a 3-camera array 50 imaging a wall 52 along with a scene of a straight wall with three parallel lines painted on it. When registered together, the lines would appear as shown in FIG. 5. The narrowing at the far left image 54 and far right image 56 are due to the fact that the straight lines are further away from the camera lens and appear converging to a point source. If, however, the wall 52 was curved with a radius equal to the radius of the array, the lines would look straight since they would be equal distance from the centroid of the array.

Figure 6:
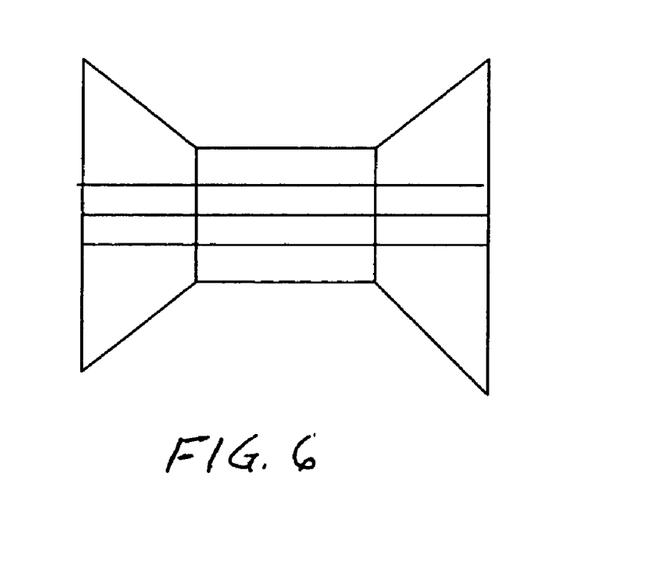
FIG. 6 is a drawing showing "bow tie" correction to perspective error.

There are several ways to deal with the natural but sometimes un-esthetic mapping of images of the type shown in FIG. 5. One way is to leave the pixel map as it is and transform the images from camera 1 and camera 3 with amplification. If done appropriately, this would graphically appear as shown in FIG. 6. This is referred to as the "bow tie correction or effect". The problem with this is that each individual pixel represents less information at the extremes of the composite photograph. In other words, the pixels look stretched. The gain is a function of distance along the horizontal axis from the center of the scene and it is generally represented as a linear function. Some pixels on both the top and the bottom of the resulting "bow tie" will be lost when the picture is cropped in a standard rectangular format. However, the advantage of this technique is that there is a 1:1 mapping of each pixel.

Another method to deal with spatial distortion of the type shown in FIG. 5 is to modify the pixel maps. Since the fixed geometries of the cameras (FIG. 4) to each other are known, the pixel maps can be modified to make it appear as if from a cylinder. For example, assume the wall 52 is really curved with an arc angle equal to the angle scribed by the lenses, there would be no distortion at all. Without knowing the distance from the wall 52 to the camera array 50, there would be no way of determining the actual case. However, knowing the distance from the camera array 50, each pixel can be modified according to the translation of the wall shape to a cylinder. One way to accomplish this translation is to oversample all of the images by a factor of 4:1 and then apply trapezoidal correction on far-field objects assuming the infinity points are along the horizontal line through the center of the composite image. An object that extends in range from the centroid with respect to its adjacent pixels with the same 3-dimensional equation mapped to 2-dimensions as a straight line segment is tacitly deemed a straight line segment for the correction.

Near-field objects are then translated to composite image without correction. Finally, the pixel data (objects) are interpolated as required. This does imply that the outer pixels have less resolution than the inner pixels. It also implies that, in order to maintain rectangular coordinates there is not necessarily a 1:1 mapping of pixels. Pixels are, in essence, created through interpolation or removed through averaging. The compromise between pixel density and perspective error is aided by creating images with a very large number of pixels/square area. The second embodiment using lens/sensors from a Kodak DX-4900, for example, has 4.1 million pixels for a 35 mm equivalent. In this manner the oversampling interpolation (pixel creation) and undersampling (pixel averaging) is done with minimal informational loss in the result. Note that when an object is only in one image, the object is indeterminant and is defaulted to be the estimate of the closest known object that is bi-located. Selections within the AI engine will ascertain whether or not this option was a good one.

The result of the process described can be presented to a person who selects which of the approaches is preferred. This selection is recorded in the knowledgebase. The degree of compensation is also provided as options until the user makes no change and the degree in which the user selects:

a. 1 much better than 2
    b. 1 is slightly better than 2
    c. 1 is the same as 2
    d. 2 is slightly better than 1
    e. 2 is much better than 1

While a user generally selects a full image, it is possible with an AI implementation to select sections of the composite image for augmenting perspective error.

While the invention has been described in what is presently considered to be a preferred embodiment, many variations and modifications will become apparent to those skilled in the art. For example, while digital imaging is preferred, the invention could use an array of film-based cameras. After the scenes are captured, the film is later removed and developed. The images are then scanned into digital images using commercially available digital scanners. The digital images are then input into the Mapper through a USB port. The set geometries of the film-based camera array design are then used as input data to the DSP program. All other functions of the invention are then executed as described. Accordingly, it is intended that the invention not be limited to the specific illustrative embodiment but be interpreted within the full spirit and scope of the appended claims.

What is claimed is:

1. In an imaging system for obtaining a wide field of view comprising a plurality of imaging devices each having a defined field of view and each of the imaging devices having a mechanism for capturing an image at a selected time instant, apparatus for positioning the plurality of imaging devices in an arcuate array such that the field of view of each device overlaps the field of view of each adjacent device, a control module for simultaneously actuating each of the imaging devices for capturing an image within the field of view of all devices concurrently, a method for combining the images from each of the devices to produce a wide field of view image, comprising:

determining a centroid of the array of imaging devices:
    identifying objects that are common to images obtained from adjacent ones of the imaging devices and grouping the common objects based upon distance from the centroid into bins;
    performing gross registration of the identified objects using auto-correlation;
    selecting points on the identified common objects based upon bin identification;
    applying an n-dimensional polynomial to merge the common identified points in one image into alignment with points in an adjacent image; and
    creating a continuous image from the merged plurality of adjacent images.

2. The method of claim 1 wherein the step of identifying common objects includes the steps of pre-processing the images by filtering and warping to facilitate identifying common objects.

3. The method of claim 1 and including the step of normalizing concurrent images with respect to color, brightness and contrast.

4. The method of claim 3 and including the step of filtering the continuous image by linear compression over a beginning and ending portion while maintaining the image constant over a middle portion.

5. The method of claim 4 wherein the beginning, ending and middle portions comprise equal portions.

6. The method of claim 5 and including applying a neural network equation to weighted values of selected photographic parameters, changing the weighted value of the parameters, comparing images obtained with original and changed parameter values, selecting a better image transition between adjacent images, and repeating the steps of changing the weighed value and applying the neural network equation to obtain a least noticeable transition between adjacent images.

7. The method of claim 6 the selected parameters are taken from the group consisting of light compensation, high pass filter response, interpolation approach, and special transformations.

8. The method of claim 6 and including adjustment of the values of the neural equation each time a comparison is made so as to "learn" the optimum settings.

9. The method of claim 6 wherein the comparisons are measured in five states consisting of much better, slightly better, the same, slightly worse, or much worse.

* * * * *